United States Patent
Fowler et al.

(10) Patent No.: US 8,467,303 B2
(45) Date of Patent: Jun. 18, 2013

(54) METHOD AND APPARATUS FOR PREVENTING NETWORK CONFLICT

(75) Inventors: Hayden Fowler, Christchurch (NZ); Tim Beale, Christchurch (NZ); Sharee McNab, Christchurch (NZ); Seiichiro Satoh, Fujisawa (JP)

(73) Assignee: Allied Telesis Holdings K.K., Tokyo (JP)

( * ) Notice: Subject to any disclaimer, the term of this patent is extended or adjusted under 35 U.S.C. 154(b) by 293 days.

(21) Appl. No.: 12/238,911

(22) Filed: Sep. 26, 2008

(65) Prior Publication Data

US 2009/0086620 A1   Apr. 2, 2009

Related U.S. Application Data

(60) Provisional application No. 60/960,444, filed on Sep. 28, 2007.

(51) Int. Cl.
*H04L 12/26* (2006.01)

(52) U.S. Cl.
USPC .......................................... 370/248; 370/447

(58) Field of Classification Search
USPC .............. 370/216, 217, 218, 221, 222, 223, 370/351, 389, 412, 413, 414, 225, 226, 227, 370/241, 242; 709/208, 211, 209; 714/100, 714/1, 2, 3, 5, 6
See application file for complete search history.

(56) References Cited

U.S. PATENT DOCUMENTS

| | | | |
|---|---|---|---|
| 5,296,936 A | | 3/1994 | Pittas et al. |
| 6,643,465 B1 | | 11/2003 | Bosinger et al. |
| 7,221,650 B1 * | | 5/2007 | Cooper et al. ............... 370/236 |
| 2002/0087751 A1 * | 7/2002 | Chong, Jr. ..................... 710/33 |
| 2003/0169748 A1 * | 9/2003 | Weyman et al. ............. 370/401 |
| 2004/0001485 A1 * | 1/2004 | Frick et al. .................... 370/389 |
| 2005/0157707 A1 * | 7/2005 | Sternagle ...................... 370/352 |
| 2006/0053216 A1 * | 3/2006 | Deokar et al. ................ 709/223 |
| 2006/0133300 A1 * | 6/2006 | Lee et al. ...................... 370/254 |
| 2006/0203720 A1 * | 9/2006 | Kano ............................. 370/228 |
| 2006/0215546 A1 * | 9/2006 | Tochio .......................... 370/218 |
| 2007/0280102 A1 * | 12/2007 | Vasseur et al. ............... 370/225 |
| 2007/0288585 A1 * | 12/2007 | Sekiguchi et al. ........... 709/209 |
| 2008/0068988 A1 * | 3/2008 | Tochio .......................... 370/228 |
| 2008/0288607 A1 * | 11/2008 | Muchow ...................... 709/209 |

FOREIGN PATENT DOCUMENTS

| | | |
|---|---|---|
| JP | 5-257844 | 8/1993 |
| JP | 2001-45038 A | 2/2001 |
| JP | 2005-150959 A | 6/2005 |
| JP | 2007-502565 A | 2/2007 |
| WO | WO 2005/015840 A1 | 2/2005 |

OTHER PUBLICATIONS

Office Action in JP 2010-527176 issued Jul. 25, 2012.

* cited by examiner

*Primary Examiner* — Kwang bin Yao

(74) *Attorney, Agent, or Firm* — Arent Fox LLP

(57) ABSTRACT

A resiliency-link having a master node and slave nodes may be used to automatically avoid network conflicts due to failure of a node stack. Any stack stub formed as a result of the failure of a stack node or link may use the resiliency-link to determine whether the stack Master node is still online and providing service. If communication over the resiliency-link determines that the original Master node is offline, a new stack stub takes over and provides the desired service. If the original Master node is still online, then the new stack stub takes an appropriate alternative or fallback action.

13 Claims, 12 Drawing Sheets

PRIOR ART

PRIOR ART

PRIOR ART

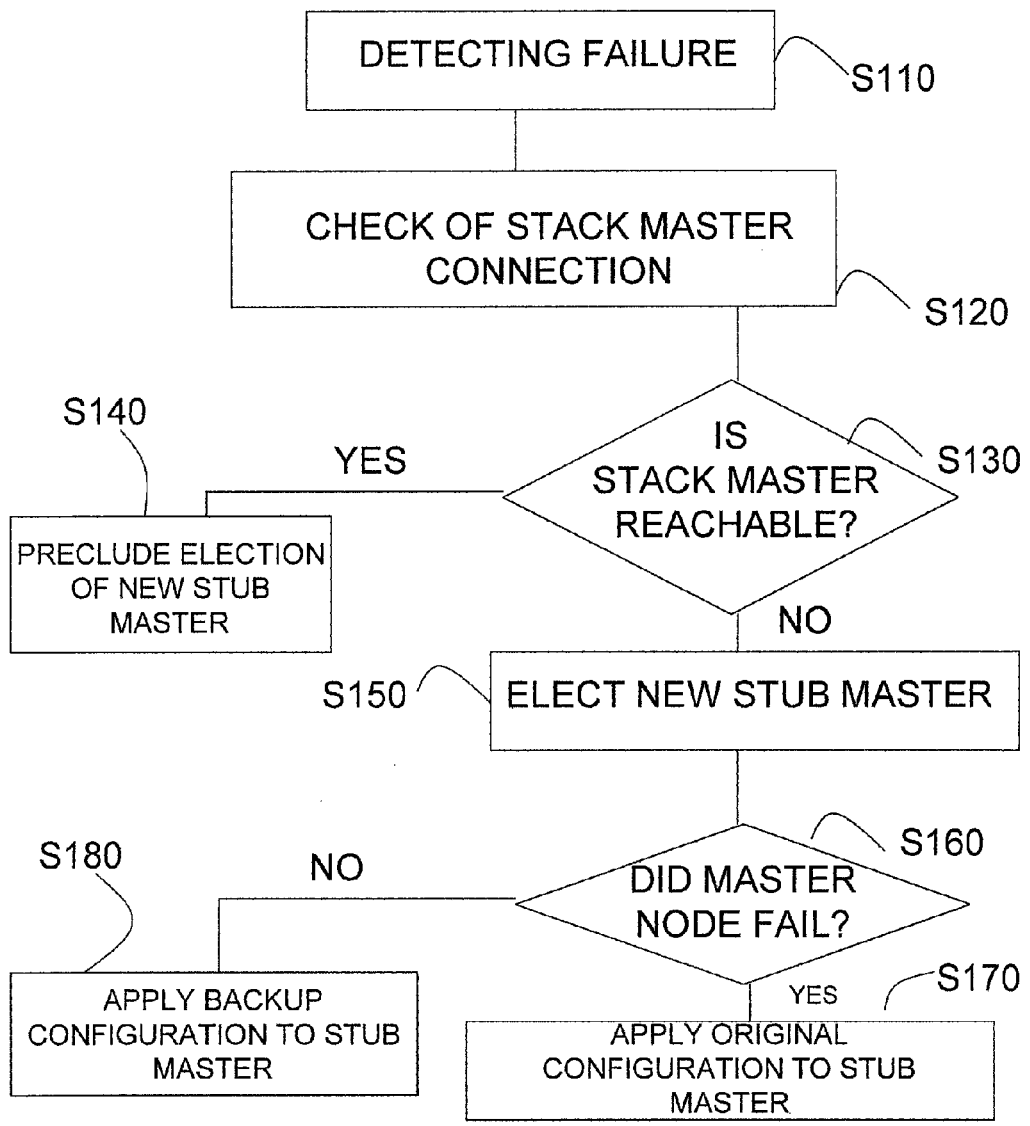

METHOD AND APPARATUS FOR PREVENTING NETWORK CONFLICT

This application claims priority from provisional U.S. Patent Application No. 60/960,444, filed on Sep. 28, 2007, titled "Virtual Chassis Stacking." This provisional application is incorporated herein in its entirety.

BACKGROUND OF THE INVENTION

1. Field of Invention

The present invention relates to an apparatus and method to prevent network conflicts. More specifically, the present invention relates to an apparatus and method to prevent network conflicts in case of link or node failure in a network stack.

2. Description of Related Art

A network comprises a number of network nodes. A node stack provides a means to group one or more of these network nodes into a single virtual network node that may provide a desired service, for example hosting an IP address. When a failure occurs, which generally results in the stack nodes becoming disconnected from each other, stack stubs are created, which are smaller groups of nodes that are still connected to each other after the failure has occurred. Thus, a newly formed stack stub may no longer be able to use the stack's preferred communication path to determine if the Master node (e.g., in another stub stack) is still online and providing service, or whether the Master node is no longer operational.

As a result, an undesirable outcome of the failure may be that any resulting stack stubs may end up providing duplicate services with the original stack. For example, a first stub and a distinct second stub may both end up hosting the same IP address that was hosted by the original stack. A network conflict arises as a result. Alternatively, an equally undesirable outcome occurs when none of the stack stubs resulting from the failure provides the service, which results in a failure of the service. In the above example, the result would be that the IP address becomes unreachable.

There is a need in the art, therefore, for an apparatus and method for preventing network failures that result in duplication of services or failures to provide services.

SUMMARY OF THE INVENTION

In light of the above described problems and unmet needs and according to various exemplary aspects of the current invention, a resiliency-link apparatus, and method of operation thereof, provides an alternative communication path used for monitoring the health of a given stack and the nodes that form the stack. The health of a stack node may be, for example, whether the node is online or offline, or whether the stack is capable of providing a particular service such as hosting an IP address. The various exemplary aspects of the current invention may facilitate dynamic and automated recovery from catastrophic stack failures, where the preferred communication path(s) between stack nodes is severed.

According to various exemplary aspects of the current invention, a resiliency-link may be used to overcome the above-described undesirable situations by providing a stacking solution that is highly resilient to failures. The resiliency link may be similar to a network link, but with a bandwidth that is lower than a typical network link, and may contain only stack control information, Any new stack stub, formed as a result of the failure of a stack node or of a link, may use the resiliency-link to determine whether the original stack stub is still online and providing service. According to various exemplary aspects of the current invention, if, via a communication over the resiliency-link, it is determined that the original stack stub is offline, the new stack stub takes over and provides the desired service such as, for example, hosting an IP address. On the other hand, if via a communication over the resiliency-link, it is determined that the original stack master is online, then the new stack master may take an appropriate alternative or fallback action. According to various exemplary aspects of the current invention, that appropriate or alternative fallback action may be, for example, hosting a different IP address, or not hosting any IP address at all. It should be noted that the service provided by a stack is defined by a configuration. Thus, configuring a stack may be providing an IP address, for example, which is the service provided by the stack.

According to various exemplary aspects of the current invention, the resiliency-link may be used in conjunction with a fallback-configuration, which may dynamically reconfigure a new stack stub resulting from a failure within an original stack, to provide alternative services that do not conflict with the services provided by the original stack. The resiliency-link and fallback-configuration may allow a stack to recover from failures, without user intervention, by allowing the stack to split into two or more separate stack stubs, which may co-exist in a stable condition, thereby avoiding network conflict.

According to various exemplary aspects of the current invention, a resiliency link may be used with a ring topology stack, a star topology, a dual-star topology, a mesh topology, or any other stack topology. According to various exemplary aspects of the current invention, the resiliency link may be a secondary ring connecting the various nodes within a given stack, or may use a hub to connect to each node of a given stack.

Additional advantages and novel features of these aspects of the invention will be set forth in part in the description that follows, and in part will become more apparent to those skilled in the art upon examination of the following or upon learning by practice of the invention.

BRIEF DESCRIPTION OF THE DRAWINGS

Various exemplary embodiments of the systems and methods will be described in detail, with reference to the following figures, wherein:

FIG. 3 is a flow chart illustrating a method of preventing network conflict in a node stack, according to various aspects of the current invention;

DETAILED DESCRIPTION OF PREFERRED EMBODIMENTS

These and other features and advantages of this invention are described in, or are apparent from, the following detailed description of various exemplary aspects of the current invention.

Figure 1A:
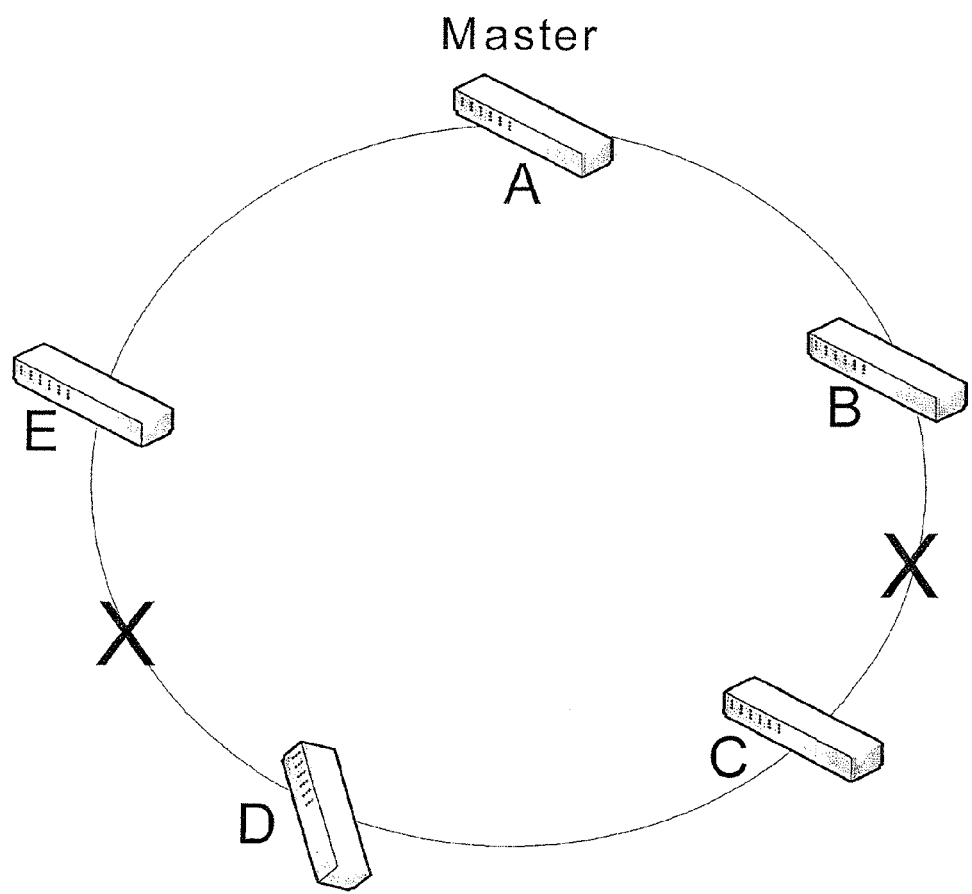
FIGS. 1A-1D are diagrams illustrating conventional node stacks experiencing failure.

FIGS. 1A-1D are diagrams illustrating conventional node stacks experiencing failure. FIG. 1A illustrates a conventional node stack that includes a Master node A and several slave nodes B, C, D and E in a ring topology stack, in which a failure of two data-links has occurred. In FIG. 1A, the data or network links between nodes B and C, and the data or network links between nodes D and E have failed and can no longer transmit data. As a result, two stack stubs are formed, a first stub including the original Master node A with nodes B and E, and a second stack stub is formed that includes nodes C and D. In the second stack stub, upon detection of the failure of the original stack, a new stack master is elected, where one of the nodes C or D becomes a master node and the new master node C or D will have the same configuration as the original Master node A. In other words, the new master node C or D will configure itself to provide the same services as Master node A. As a result, two stack stubs are created, each having the same configuration, which results in a network conflict.

Figure 1B:
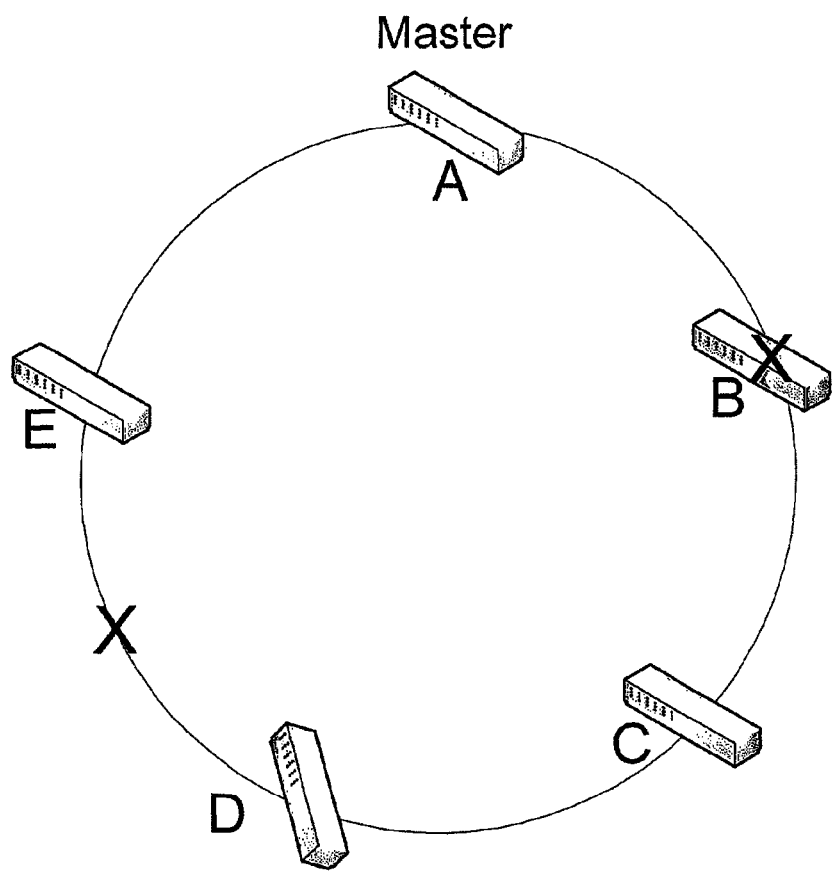

FIG. 1B illustrates a conventional node stack including a Master node A and several slave nodes B, C, D and E in a ring topology stack, in which the data link between nodes D and E has failed, and node B has failed. As a result, two stack stubs are formed, a first stub including the original Master node A and node E, and a second stack stub is formed that includes nodes C and D. In the second stack stub, upon detection of the failure in the original stack, a new stack master is elected, where one of the nodes C or D becomes a master node, and the new master node C or D will have the same configuration as the original Master node A. In other words, the new master node C or D will configure itself to provide the same services as Master node A. Accordingly, two stack stubs are created, both having the same configuration, which results in a network conflict.

Figure 1C:
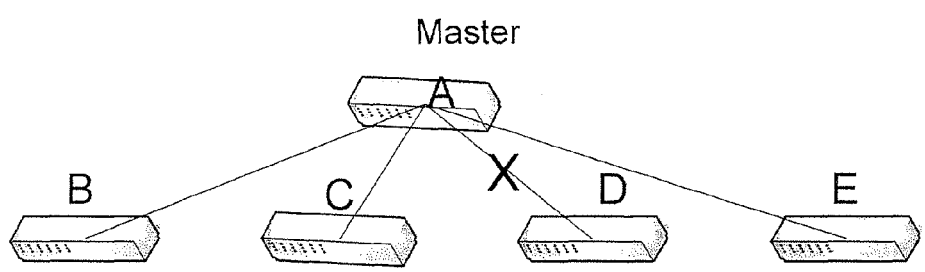

FIG. 1C illustrates a conventional node stack including a Master node A and several slave nodes B, C, D and E in a star topology stack, in which the data link between nodes A and D has failed. As a result, two stack stubs are formed, a first stub that includes the original Master node A and nodes B, C and E, and a second stack stub that is formed by node D. In the second stack stub formed by node D, upon detection of the failure in the original stack, D elects itself as a new stack master, and the new master node D will have the same configuration, and/or provide the same service, as the original Master node A. Accordingly, two stack stubs are created, both having the same configuration, which results in a network conflict.

Figure 1D:
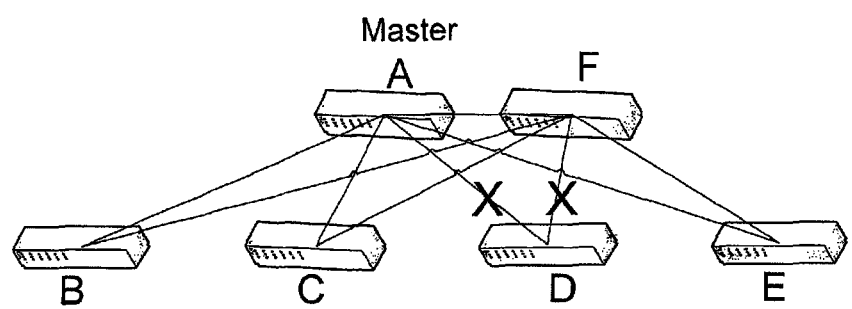

FIG. 1D illustrates a conventional node stack including a Master node A and several slave nodes B, C, D, E and F in a dual-star topology stack, in which the data links between nodes A and D, and between nodes F and D, have failed. As a result, two stack stubs are formed, a first stub that includes the original Master node A and nodes B, C, E and F, and a second stack stub that is formed by node D. In the second stack stub formed by the node D, upon detection of the failure in the original stack, D elects itself as a new stack master, and the new master node D will have the same configuration, and/or provide the same service, as the original Master node A. Accordingly, two stack stubs are created, both having the same configuration, which results in a network conflict.

Figure 2A:
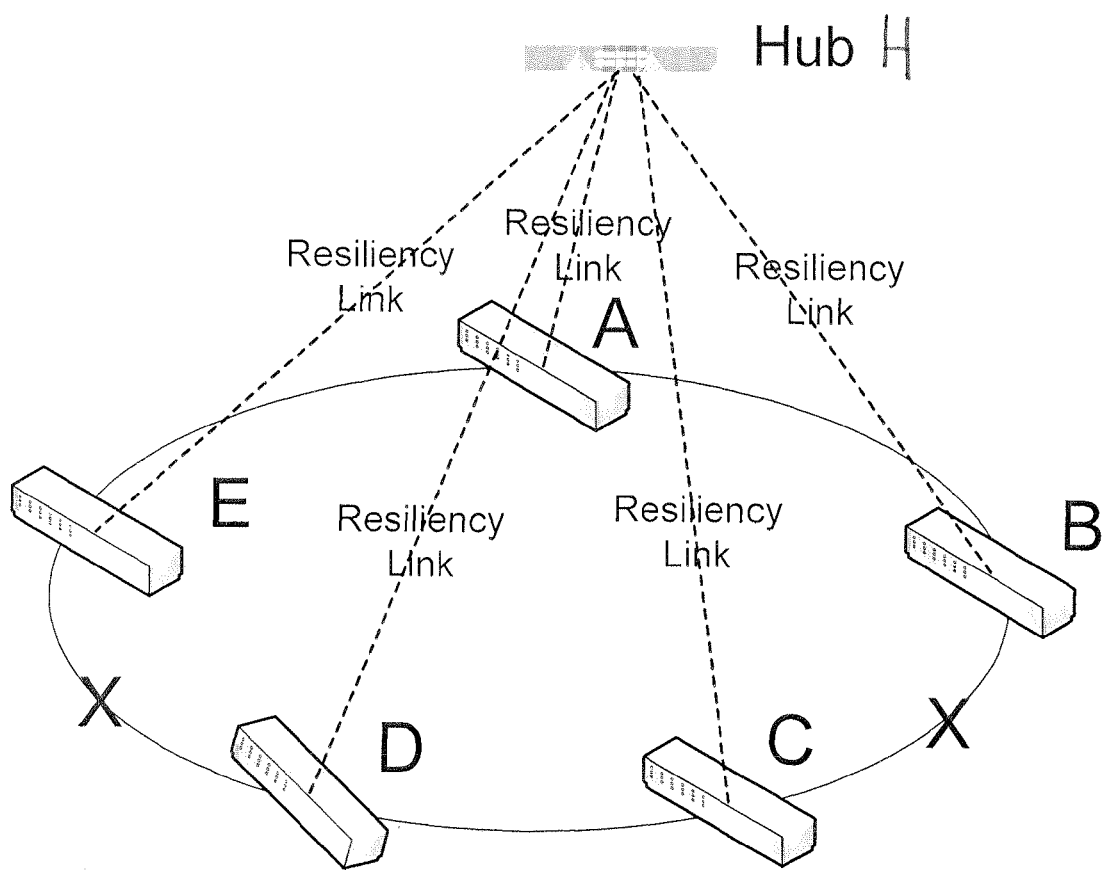
FIGS. 2A-2E are diagrams illustrating node stacks including resiliency links, according to various aspects of the current invention.

FIGS. 2A-2E are diagrams illustrating node stacks including resiliency links, according to various aspects of the current invention. FIG. 2A is a diagram illustrating a node stack including a Master node A and several slave nodes B, C, D and E in a ring topology stack according to various exemplary aspects of the present invention, in which the data links between nodes B and C, and between nodes D and E have failed. According to various exemplary aspects of the current invention, the node stack also includes a hub H that is connected to each of nodes A, B, C, D and E, via a resiliency link. The resiliency link may be a network link having bandwidth that is lower than the bandwidth of a typical network data link. The resiliency link may contain stack control information only, and the resiliency link may be devoid of user data that is typically carried on a network data link. The resiliency link may also be less expensive than a conventional network data link forming a ring. Upon failure of the data links between nodes D and E, and between nodes B and C, two stack stubs are formed. The Master node A forms a first stack stub with nodes B and E, and nodes C and D form a second stack stub. Nodes C and D would negotiate to select a master node for the second stack stub. In the absence of the resiliency link, nodes C and D would apply the original stack configuration. However, because the resiliency link connects each of the nodes A, B, C, D and E to the hub H, the hub H may convey the information to each of the nodes B, C, D and E that the Master node A is still operational. When nodes C and D in the second stub detect, via the resiliency link, that the original Master node A is still operational, the nodes C and D may load an alternative configuration from an alternative configuration file to prevent a network configuration conflict. Alternatively, nodes C and D may load no configuration at all. In either case, no network conflict results.

Figure 2B:
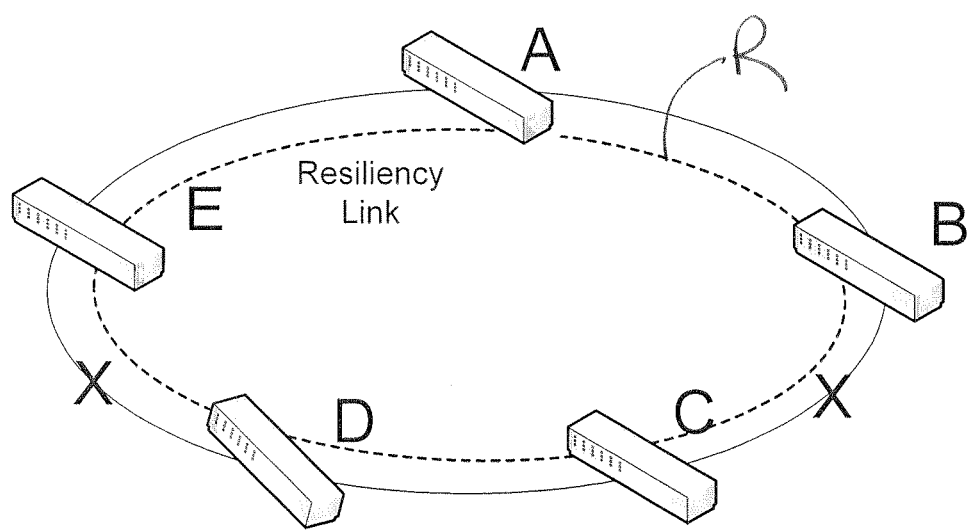

FIG. 2B is a diagram illustrating a node stack including a Master node A and several slave nodes B, C, D and E in a ring topology stack without a hub, according to various exemplary aspects of the present invention. In FIG. 2A, the data links between nodes B and C and between nodes D and E have failed. According to various exemplary aspects of the current invention, the node stack also includes a resiliency link R that connects nodes A, B, C, D and E. The resiliency link R may be a network link having a bandwidth that is lower than the bandwidth of a typical network data link, and may only contain stack control information. The resiliency link R may be devoid of user data that is typically transmitted over a network data link. Upon failure of the data links between nodes D and E, and between nodes B and C, two stack stubs are formed, but the resiliency link R remains connected to all the nodes A, B, C, D and E. The Master node A forms a first stack stub with nodes B and E, and nodes C and D form a second stack stub. Nodes C and D would negotiate to select a master node for the second stack stub. In the absence of the resiliency link R, nodes C and D would apply the original stack configuration. However, because the resiliency link R connects each of nodes A, B, C, D and E together, the resiliency link R may convey the information to each of the slave nodes, including nodes C and D, that Master node A is still operational. When nodes C and D in the second stack stub detect, via the resiliency link R, that the original master node A is still operating, nodes C and D may load an alternative configuration to prevent a network configuration conflict. Alternatively, nodes C and D may load no configuration at all. In either case, no network conflict results.

Figure 2C:
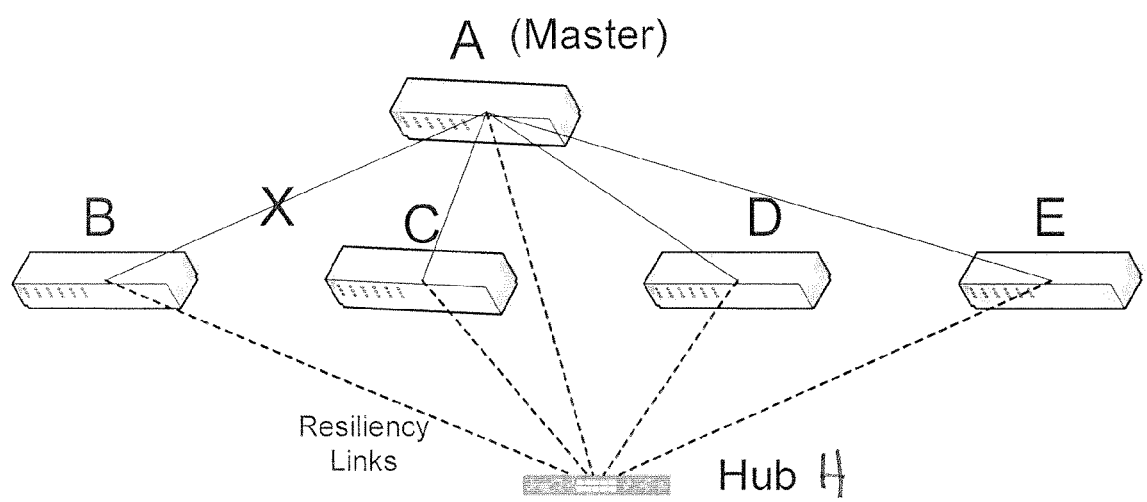

FIG. 2C is a diagram illustrating a node stack including a Master node A and several slave nodes B, C, D and E in a star topology stack according to various exemplary aspects of the present invention. In FIG. 2C, the data link between nodes A and B has failed. According to various exemplary aspects of the current invention, the node stack also includes a hub H that is connected to each of the nodes A, B, C, D and E, via a resiliency link. The resiliency link may be a network link having a bandwidth that is lower than the bandwidth of a typical network data link, and may only contain stack control information. The resiliency link may be devoid of user data that is typically transmitted over a network data link. Upon failure of the data link between nodes A and B, two stack stubs are formed. Master node A forms a first stack stub with nodes C, D and E, and node B alone forms a second stub stack. Node B would become the master node for the second stack stub. In the absence of the resiliency link, node B would apply the original stack configuration. However, because the resiliency link connects node B to the hub H, the hub H may convey the information to node B that the Master node A is still operational. When node B in the second stub detects, via the resiliency link, that the original master node A is still operating, node B may load an alternative configuration to prevent a network configuration conflict. Alternatively, node B may load no configuration at all. In either case, no network conflict results.

Figure 2D:
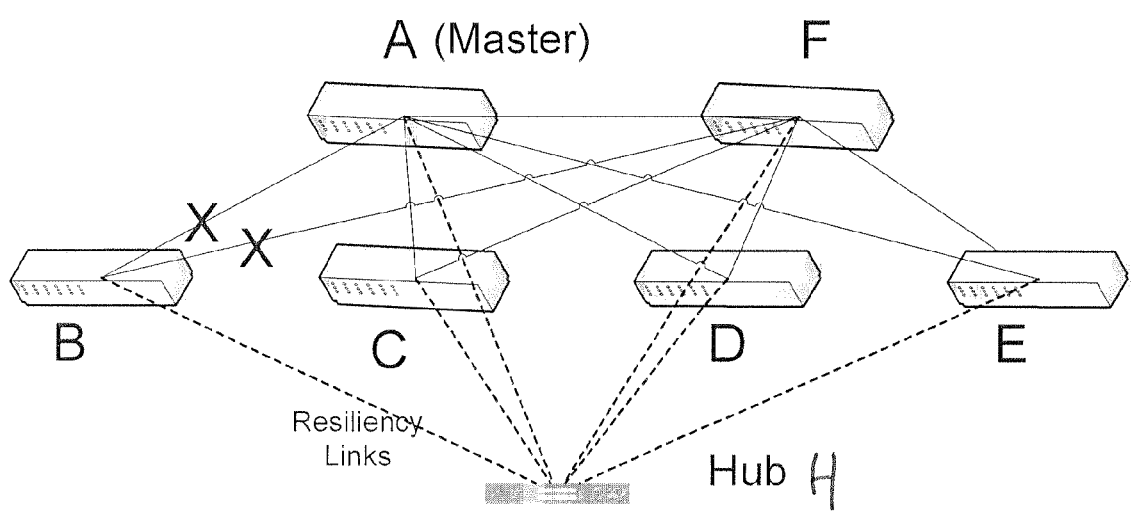

FIG. 2D is a diagram illustrating a node stack including a Master node A and several slave nodes B, C, D, E and F in a dual-star topology stack, in which the data links between nodes A and B and between nodes B and F have failed. According to various exemplary aspects of the current invention, the node stack also includes a hub H that is connected to each of the nodes A, B, C, D, E and F via a resiliency link. The resiliency link may be a network link having a bandwidth that is lower than the bandwidth of a typical network data link, and may only contain stack control information. The resiliency link may be devoid of user data that is typically transmitted over a network data link. Upon failure of the data links between nodes A and B and between nodes B and F, two stack stubs are formed. The Master node A forms a first stack stub with nodes C, D, E and F, and node B alone forms a second stack stub. Node B would negotiate to select a master node for the second stack stub. In the absence of the resiliency link, node B would apply the original stack configuration. However, because the resiliency link connects node B to the hub H, hub H may convey the information to node B via the resiliency link that the Master node A is still operational. When node B detects, via the resiliency link, that the original master node A is still operational, node B may load an alternative configuration to prevent a network configuration conflict. Alternatively, node B may load no configuration at all. In either case, no network conflict results.

Figure 2E:
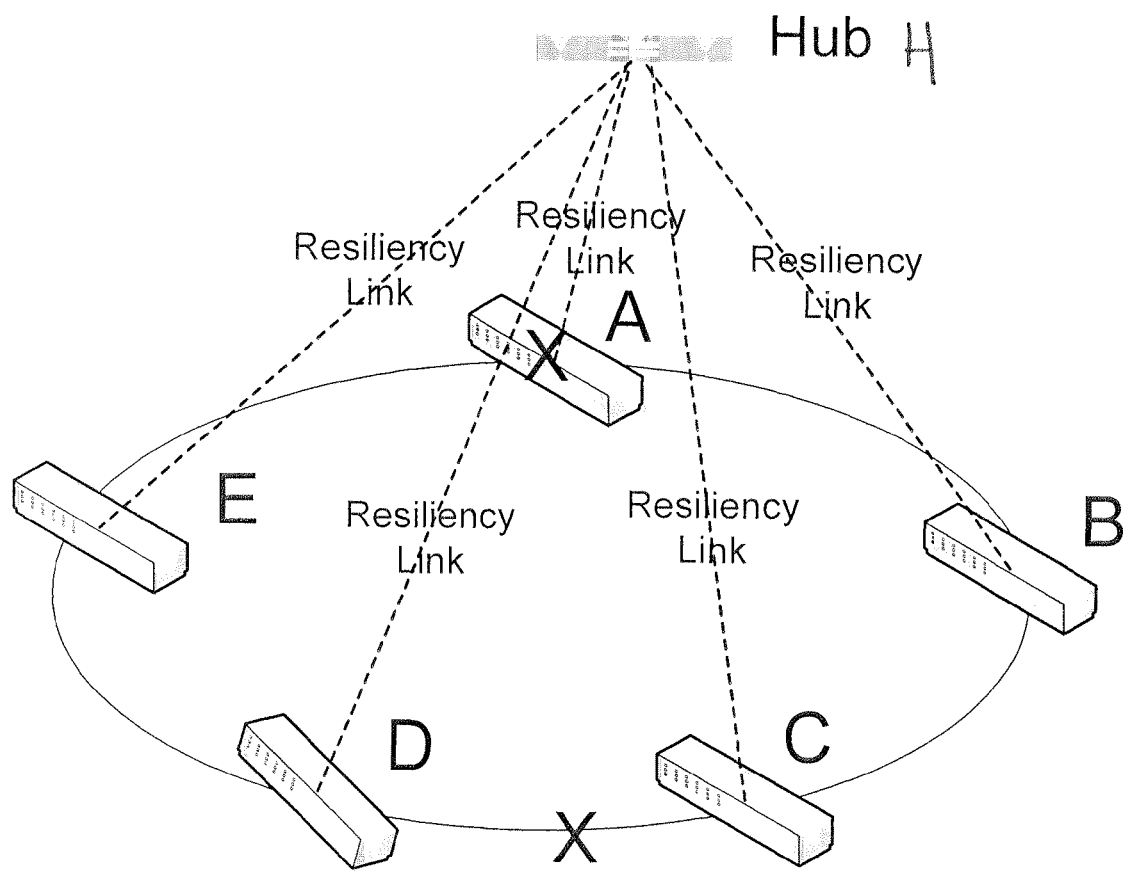

FIG. 2E is a diagram illustrating a node stack including a Master node A and several slave nodes B, C, D and E in a ring topology stack, in which the data link between nodes C and D, and node A, have failed. According to various exemplary aspects of the current invention, the node stack also includes a hub H, connected to each of nodes A, B, C, D and E, via a resiliency link. The resiliency link may be a network link having a bandwidth that is lower than the bandwidth of a typical network data link, and may only contain stack control information. The resiliency link may be devoid of user data that is typically transmitted over a network data link. Upon failure of the data link between nodes C and D, and failure of node A, two stack stubs are formed, a first stack stub is formed with nodes D and E, and a second stack stub is formed with nodes B and C. In this case, and in the absence of a master node, nodes B and C negotiate to elect a master node for the first stub, and nodes D and E negotiate to elect a master node for the second stub. Hub H conveys information regarding the operative state of the nodes to each of the nodes via the resiliency links. The resiliency link here may be used to allow negotiation to take place between the two stack stubs to determine which stack stub will apply the preferred configuration and which stack stub will apply an alternate configuration, by conveying information via the hub H. Accordingly, no network conflict results.

According to various aspects of the current invention, node failure may be detected in various ways. One of the ways in which failure is detected is through the use of a periodic multicast message sent to the nodes of the node stack. For example, a multicast message may be sent regularly, e.g., every 500 ms, over the resiliency link from the master node to the slave nodes. According to various aspects of the current invention, the message may contain information such as the master node's MAC address and an incrementing sequence number generated by the master node. The broadcast messages can be construed to constitute health-check messages. As long as a slave node receives these health-check messages from the master node, the slave node considers the master node to be online and operational. If no health-check messages are received from the master node by a slave node over a predetermined period of time, for example, a period of two seconds, then the slave node considers the master node to be offline and inoperative. According to various exemplary aspects of the current invention, when the master node becomes unreachable over the network data links, the one or more slave nodes that can no longer reach the master node form a stack stub, and elect a new master. If the new master no longer receives the health-check messages, indicating that the original master node is no longer operational, then the new master node may load the original configuration. On the other hand, if the health-check messages do not time out, then the new master may reconfigure the stub stack using a fallback and/or alternative configuration. According to various aspects of the current invention, a fallback configuration may range from specifying a back-up IP address to a complete configuration for an alternative stack setup. If no fallback configuration is available, then the slave nodes may deconfigure themselves and shut down all network interfaces to avoid a network conflict.

It should be noted that other communication protocols can be used, according to aspects of the current invention, over the resiliency links to ascertain the status of a stack node. Such communication protocols may be, for example, Internet Control Message Protocol (ICMP) echo requests, Address Resolution Protocol (ARP)/Reverse Address Resolution Protocol (RARP) requests, or discovery protocols such as Link Layer Discovery Protocol (LLDP).

The health-check messages may also, according to various aspects of the current invention, specify a dynamic negotiation of the recovery action for a given stack, For example, the fallback configuration may be negotiated based upon which stack stub has the least number of nodes present, so that the preferred stack stub configuration is applied to the stack stub that has the most bandwidth. Alternatively, the stack stubs may have several fallback configuration files available, and negotiate which configuration file should be applied to the new stack.

FIG. 3 is a flow chart illustrating a method of preventing network conflict in a node stack, according to various aspects of the current invention. The method starts at S110, where a node stack operating to provide a given service such as, for example, hosting an IP address, detects a link or node failure. According to various exemplary aspects of the current invention, the node stack includes a resiliency link, which may be similar to a secondary ring, and may have a bandwidth that is smaller than or equal to the bandwidth of a conventional data ring. The resiliency link connects each node in the node stack to at least one other node in the node stack. Alternatively, the resiliency link may be connected to a hub that connects each node of the node stack. Next, the method continues to S120, where a check is made to see if the stack master is still connected to each slave node over the network data links. In S130, in the event that the Master is still reachable from every slave node over the network data links, no isolated stacking stub has been formed, and the method continues to S140, where normal stack operation continues and no stub master is elected.

In S130, in the event that the master is not reachable from each slave node, the method continues to S150 to elect a new stack master for an isolated stacking stub that has been formed as a result. The method then continues to S160, where a check may be made to determine whether the Master health check message has been received by every slave node over the resiliency link. If the Master node has failed and no health check messages have been received, then the method continues to S170, where the original configuration is applied to the local stub master. If in S160 the Master node has not failed, then the method continues to S180, where a backup configuration is applied to the local stub master, and there may be no conflict in the provision of network services between the local stub master and the original stack master. It should be noted that, according to various aspects of the current invention, instead of the backup configuration, no configuration may be applied to the local stub master in S180, and the local stub master may keep its original configuration.

Figure 4:
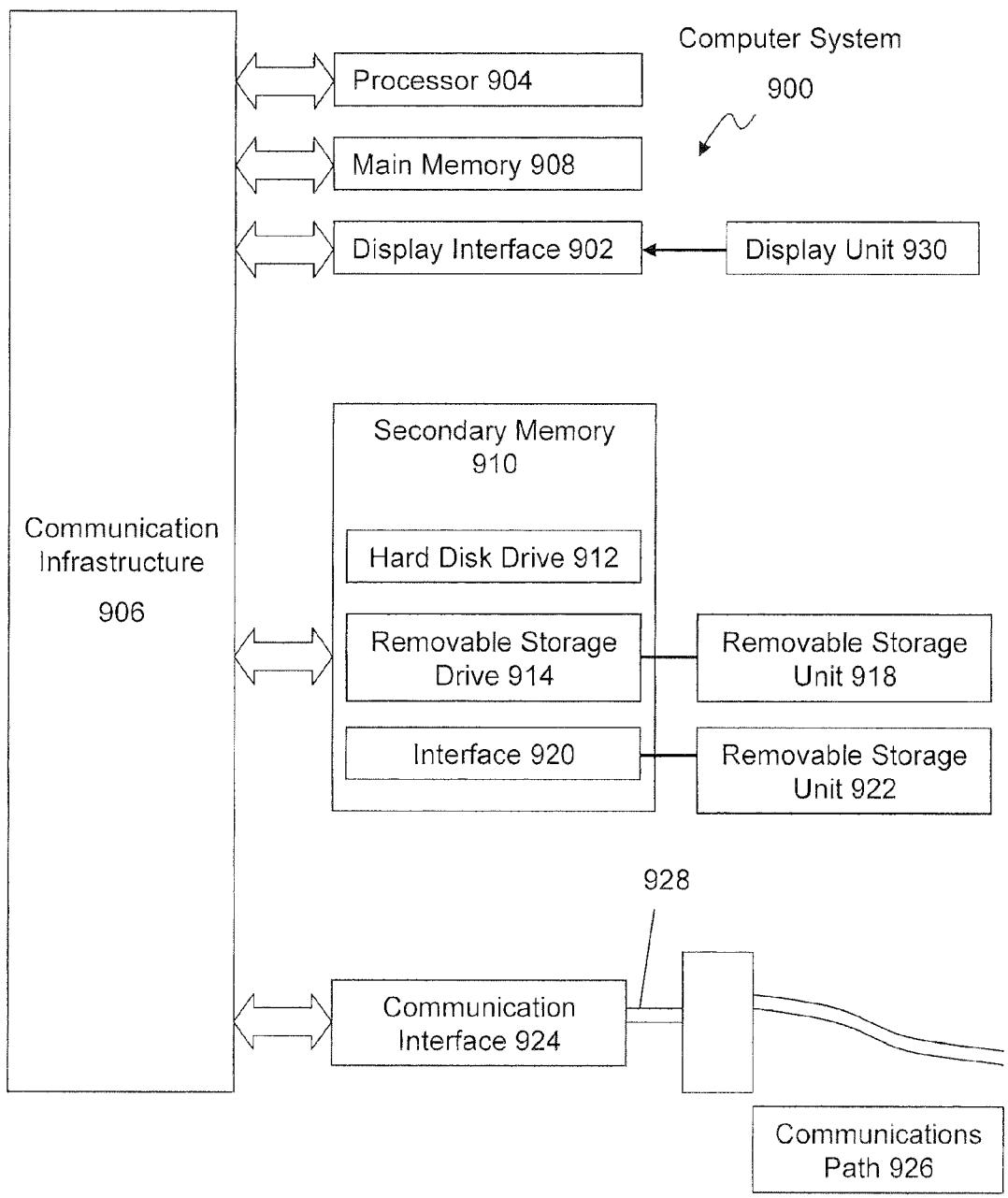
FIG. 4 presents an exemplary system diagram of various hardware components and other features, for use in accordance with aspects of the present invention.

FIG. 4 presents an exemplary system diagram of various hardware components and other features, for use in accordance with aspects of the present invention. The present invention may be implemented using hardware, software, or a combination thereof and may be implemented in one or more computer systems or other processing systems. According to one aspect, the invention is directed toward one or more computer systems capable of carrying out the functionality described herein. An example of such a computer system 900 is shown in FIG. 4.

Computer system 900 includes one or more processors, such as processor 904. The processor 904 is connected to a communication infrastructure 906 (e.g., a communications bus, cross-over bar, or network). Various software variations are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In accordance with aspects of the present invention, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals 928. These computer program products provide software to the computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 910 to perform the features of the present invention. Accordingly, such computer programs represent controllers of the computer system 900.

In a variation where the present invention is implemented using software, the software may be stored in a computer program product and loaded into computer system 900 using removable storage drive 914, hard drive 912, or communications interface 920. The control logic (software), when executed by the processor 904, causes the processor 904 to perform the functions of the present invention as described herein. In another variation, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another variation, the present invention is implemented using a combination of both hardware and software.

Figure 5:
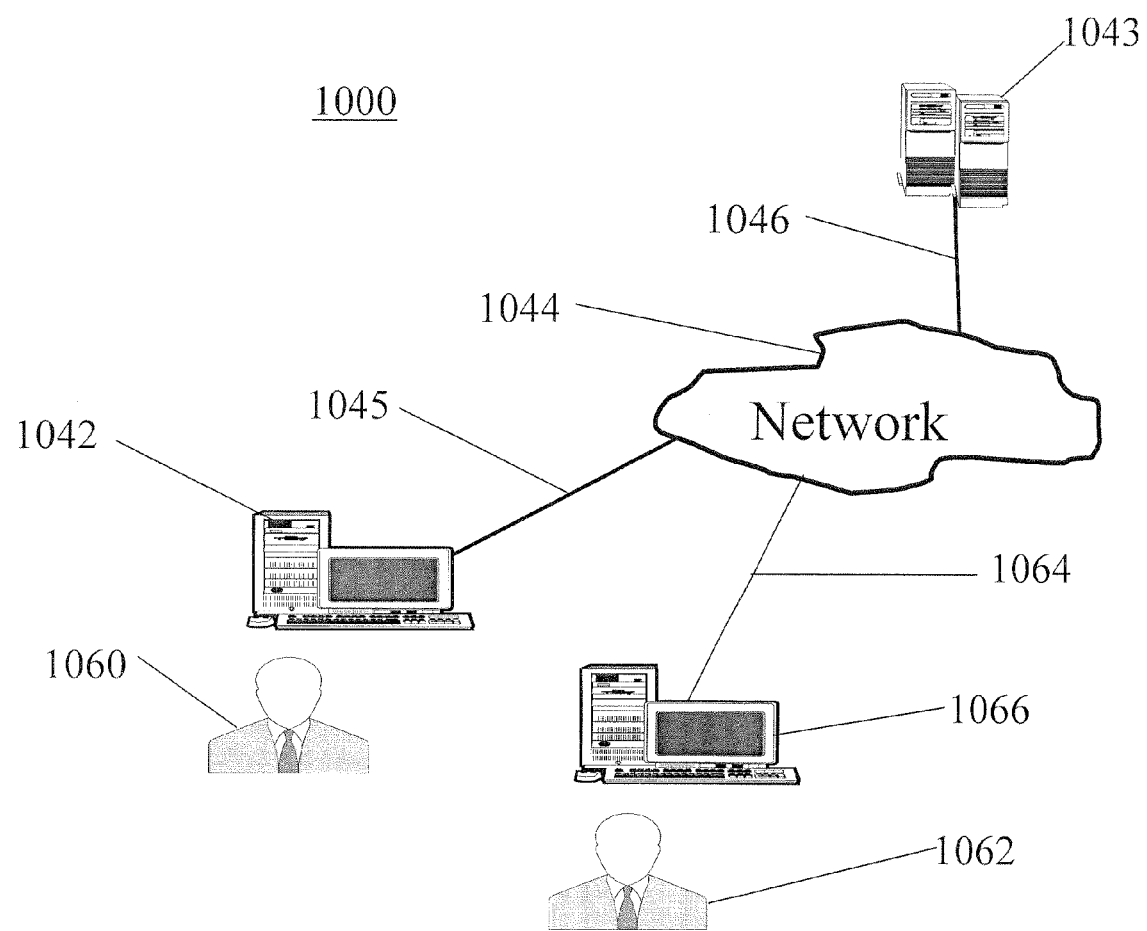
FIG. 5 is a block diagram of various exemplary system components, in accordance with aspects of the present invention.

FIG. 5 is a block diagram of various exemplary system components, in accordance with aspects of the present invention. FIG. 5 shows a communication system 1000 usable in accordance with the present invention. The communication system 1000 includes one or more accessors 1060, 1062 (also referred to interchangeably herein as one or more "users") and one or more terminals 1042, 1066. In one embodiment, data for use in accordance with the present invention is, for example, input and/or accessed by accessors 1060, 1064 via terminals 1042, 1066, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiberoptic links. One aspect of the current invention operates in a stand-alone environment, such as on a single terminal.

While this invention has been described in conjunction with the exemplary aspects outlined above, various alternatives, modifications, variations, improvements, and/or substantial equivalents, whether known or that are or may be presently unforeseen, may become apparent to those having at least ordinary skill in the art. Accordingly, the exemplary aspects of the invention, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

What is claimed is:

1. A method of preventing network conflict upon failure in a stack that includes a master node connected to a plurality of slave nodes via a network data link, the master node being configured by an original configuration file, the method comprising:
    determining that a stack master is inoperative when no health-check notification has been received by at least one slave node within a period of time;
    providing the health-check notification of a health of the master node to each slave node via a resiliency link; and
    determining an appropriate configuration to apply upon a determination of stack master failure;
    wherein the resiliency link has control information only and has a bandwidth that is lower than or equal to a bandwidth of the network data link;
    wherein determining an appropriate configuration comprises precluding an application of a conflicting configuration on the plurality of slave nodes when the notification indicates that the master node is operational.

2. The method of claim 1, wherein the health-check notification is received via the resiliency link by the slave nodes.

3. The method of claim 1, further comprising:
    reconfiguring one or more slave nodes using a fallback configuration file when the health-check notification indicates that the master node is operational.

4. The method of claim 1, further comprising:
    reconfiguring one or more slave nodes using the original configuration file when a lapse of health-check notification indicates that the master node is not operational.

5. A system for preventing network conflict upon failure in a stack that includes a master node connected to a plurality of slave nodes via a network data link, the master node being configured by an original configuration file, the system comprising:
    determining means for determining that a stack master failure has occurred when no health-check notification has been received by at least one slave node within a predetermined period of time; and
    providing means for providing the health-check notification of a health of the master node to each slave node via a resiliency link; and
    determining means for determining an appropriate configuration to apply upon a determination of stack master failure;
    wherein the resiliency link has control information only and has a bandwidth that is lower than or equal to a bandwidth of the network data link;
    wherein the determining means for determining an appropriate configuration comprises a precluding module for precluding an application of a conflicting configuration on the plurality of slave nodes when the notification indicates that the master node is operational.

6. The system of claim 5, wherein the providing means for providing a notification of the health of the master node to each slave node comprises a hub.

7. The system of claim 5, further comprising:
    reconfiguring means for reconfiguring one or more slave nodes using a fallback configuration file when the health-check notification indicates that the master node is operational.

8. The system of claim 7, wherein the reconfiguring means comprises a fallback configuration file.

9. A system for preventing network conflict upon failure in a stack that includes a master node connected to a plurality of slave nodes via a network data link, the master node being configured by an original configuration file, the system comprising:
    a processor;
    a user interface functioning via the processor; and
    a repository accessible by the processor; wherein
    a determination is made that a stack master failure has occurred when no health-check notification has been received by at least one slave node within a predetermined period of time; and
    a notification of a health of the master node is provided to each slave node via a resiliency link; and
    an appropriate configuration is applied upon a determination of stack master failure;
    wherein the resiliency link has control information only and has a bandwidth that is lower than or equal to a bandwidth of the network data link;
    wherein the appropriate configuration being applied comprises a conflicting configuration being precluded from being applied among the plurality of slave nodes when the health notification indicates that the master node is operational.

10. The system of claim 9, wherein the processor is housed on a terminal.

11. The system of claim 9, wherein the processor is housed on a server.

12. The system of claim 11, wherein the server is coupled to a network.

13. A computer program product comprising a non-transitory computer usable medium having control logic stored therein for causing a computer to prevent network conflict upon failure in a stack that includes a master node connected to a plurality of slave nodes via a network data link and configured by an original configuration file, the control logic comprising:
    first computer readable program code means for determining that a stack master failure has occurred when no health-check notification has been received by at least one slave node within a predetermined period of time; and
    second computer readable program code means for providing a notification of a health of the master node to each slave node via a resiliency link; and
    third computer readable program code means for determining an appropriate configuration to apply upon a determination of stack master failure;
    wherein the resiliency link has control information only and has a bandwidth that is lower than or equal to a bandwidth of the network data link;

wherein the appropriate configuration being applied comprises a conflicting configuration being precluded from being applied among the plurality of slave nodes when the health notification indicates that the master node is operational.

* * * * *